United States Patent
Knoll et al.

(12)
(10) Patent No.: US 6,369,160 B1
(45) Date of Patent: Apr. 9, 2002

(54) POLYMER MIXTURES COMPRISED OF STYRENE POLYMERS

(75) Inventors: Konrad Knoll, Ludwigshafen; Norbert Niessner, Friedelsheim; Josef Wünsch, Schifferstadt; Hermann Gausepohl, Mutterstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,179

(22) PCT Filed: Mar. 3, 1999

(86) PCT No.: PCT/EP99/01364

§ 371 Date: Aug. 29, 2000

§ 102(e) Date: Aug. 29, 2000

(87) PCT Pub. No.: WO99/46330

PCT Pub. Date: Sep. 16, 1999

(30) Foreign Application Priority Data

Mar. 10, 1998 (DE) .......................... 198 10 141

(51) Int. Cl.$^7$ ............................ C08L 53/02; C08L 25/06
(52) U.S. Cl. ............................................ 525/89; 525/98
(58) Field of Search ...................... 525/89, 98

(56) References Cited

U.S. PATENT DOCUMENTS 4,418,180 A 11/1983 Heinz
5,972,519 A * 10/1999 Niessner et al. ............ 428/483

FOREIGN PATENT DOCUMENTS

| DE | 44 20 952 | | 12/1995 |
|---|---|---|---|
| EP | 46 862 | | 3/1982 |
| WO | 96/20248 | | 7/1996 |
| WO | 96/23823 | | 8/1996 |
| WO | WO 96/23823 | * | 8/1996 |
| WO | 97/40079 | | 10/1997 |

OTHER PUBLICATIONS

Niessner et al. CAPLUS AN 1996:590354 abstracting WO 9623823.*

* cited by examiner

Primary Examiner—Jeffrey Mullis
(74) Attorney, Agent, or Firm—Keil & Weinkauf

(57) ABSTRACT

Polymer mixtures comprise

P1) from 1 to 85% by weight of an elastomeric block copolymer which has been built up from hard blocks S made from vinylaromatic monomers and from random soft blocks B/S made up from dienes and from vinylaromatic monomers, and which contains at least the block structure S-B/S-S, where the diene content is less than 50 percent by weight and the proportion of the soft phase formed from the blocks B/S is at least 60 percent by weight, based in each case on the entire block copolymer, P2) from 5 to 89% by weight of a block copolymer differing from P1) and made from vinylaromatic monomers and from dienes, P3) from 10 to 94% by weight of glass-clear or impact-modified polystyrene or mixtures thereof, and P4) from 0 to 84% by weight of other additives, where the total of components P1) to P4) is 100%.

5 Claims, No Drawings

POLYMER MIXTURES COMPRISED OF STYRENE POLYMERS

The invention relates to polymer mixtures comprising

P1) from 1 to 85% by weight of an elastomeric block copolymer which has been built up from hard blocks S made from vinylaromatic monomers and from random soft blocks B/S made up from dienes and from vinylaromatic monomers, and which contains at least the block structure S-B/S-S, where the diene content is less than 50 percent by weight and the proportion of the soft phase formed from the blocks B/S is at least 60 percent by weight, based in each case on the entire block copolymer, P2) from 5 to 89% by weight of a block copolymer differing from P1) and made from vinylaromatic monomers and from dienes, P3) from 10 to 94% by weight of glass-clear or impact-modified polystyrene or mixtures thereof, and P4) from 0 to 84% by weight of other additives, where the total of components P1) to P4) is 100%.

The invention also relates to the use of the polymer mixtures for producing fibers, films or moldings, and also to the resultant fibers, films and moldings.

WO 96/20248 describes impact-modified, thermoplastically processable mixtures of elastomers and thermoplastics. The elastomers used may be styrene-butadiene block copolymers with a flexible soft block B/S with a random styrene-butadiene sequence and hard blocks S made from styrene. These block copolymers are used in thermoplastics for impact modification. The thermoplastics mentioned are, inter alia, glass-clear or impact-modified polystyrene or styrene-butadiene block copolymers. During processing these exhibit improved mechanical properties and low shrinkage of the moldings. The use of such polymer mixtures for producing flexible, transparent films is described in WO 96/23823.

The toughness of thermoplastics can be increased by adding butadiene rubbers or styrene-butadiene block copolymers. However, with this there is usually an associated reduction in stiffness. In addition, high butadiene proportions in the polymers used for impact modification can lower heat resistance and weathering resistance. High proportions of rubbers or of block copolymers also make the corresponding thermoplastic molding compositions more expensive.

It is an object of the present invention to provide polymer mixtures which are easy to process and have high ultimate tensile strength together with stiffness which can be adjusted over a wide range. Compared with conventional polystyrene mixtures, the polymer mixtures should have the same elongation at break with a very low proportion of butadiene-containing polymers.

We have found that this object is achieved by means of the polymer mixtures mentioned at the outset.

The novel polymer mixtures comprise, as component P1), from 1 to 85% by weight, preferably from 2 to 62% by weight, particularly preferably from 5 to 35% by weight, of an elastomeric block copolymer which has been built up from hard blocks S made from vinylaromatic monomers and from random soft blocks B/S made from dienes and from vinylaromatic monomers, and which contains at least the block structure S-B/S-S, where the diene content is less than 50 percent by weight and the proportion of the soft phase formed from the blocks B/S is at least 60 percent by weight, based in each case on the entire block copolymer.

A feature of the block copolymers P1) is that a block B/S of random structure and made from diene units and from vinylaromatic units occurs as soft phase instead of a pure polydiene block in a vinylaromatic-diene block copolymer made from blocks forming hard (block type S) and soft phases. The structure here along the chain may, on average statistically, be homogeneous or inhomogeneous.

An elastomeric block copolymer of this type according to the invention is obtained within the abovementioned parameters by forming the soft phase from a random copolymer of a vinylaromatic compound with a diene. Random copolymers of vinylaromatic compounds and dienes are obtained by polymerization in the presence of a polar cosolvent or of a potassium salt.

The random incorporation of the vinylaromatic compound into the soft block of the block copolymer and the use of Lewis bases during the polymerization affect the glass transition temperature ($T_g$). The glass transition temperature of the soft block B/S is preferably from −50 to +25° C., preferably from −50 to +5° C., particularly preferably from −50 to −15° C.

The glass transition temperature of the hard block S is preferably above 25° C., particularly preferably above 50° C.

The molar mass of a block S is preferably from 1000 to 200,000 g/mol, in particular from 5000 to 50,000 g/mol. It is very particularly preferable for the molar mass of a block S to be from 10,000 to 20,000 g/mol. Blocks S within a molecule may have various molar masses.

The molar mass of the block B/S is usually from 2,000 to 250,000 g/mol and preferably from 20,000 to 150,000 g/mol.

Block B/S, like block S, may assume various molecular weights within a molecule.

Preferred polymer structures are S-B/S-S, X-[-B/S-S]$_2$ and Y-[-B/S-S]$_2$. X is the radical of a bifunctional coupling agent and Y is the radical of a bifunctional initiator. The random block B/S may itself again be subdivided into blocks $(B/S)_1$–$(B/S)_2$–$(B_3/S)_3$– . . . The random block is preferably composed of from 2 to 15 random sub-blocks, particularly preferably from 3 to 10 sub-blocks. Dividing the random block B/S into very many sub-blocks $(B/S)_n$ has the important advantage that the B/S block overall behaves as an almost perfect random polymer even if there is a gradient in its make-up within a sub-block $(B/S)_n$, as is difficult to avoid in anionic polymerization under industrial conditions (see below). It is therefore possible to use less than the theoretical amount of Lewis base. This increases the proportion of 1,4-diene linkages, lowers the glass transition temperature $T_g$ and reduces the tendency of the polymer to crosslink.

Preference is given to a block copolymer of one of the formulae S-B/S-S, where

S is a vinylaromatic block and

B/S is the soft phase made from a block built up randomly from diene units and vinylaromatic units.

The soft phase may be subdivided into blocks $(B/S)_1$–$(B/S)_2$, where the indices 1 and 2 represent different structures in the sense that the vinylaromatic/diene ratio is different in the individual blocks B/S or changes continuously within a block within the limits $(B/S)_1(B/S)_2$, where the glass transition temperature $T_g$ of each sub-block is less than 25° C.

Particular preference is given to a soft block B/S which has been subdivided into more than one block $(B/S)_n$ of identical make-up.

Preference is also given to a block copolymer which has, in each molecule, more than one block B/S and/or S with different molar mass.

Preferred vinylaromatic compounds for the purposes of the invention are styrene and also α-methylstyrene and vinyltoluene, and also mixtures of these compounds. Preferred dienes are butadiene and isoprene, and also piperylene, 1-phenylbutadiene and mixtures of these compounds.

A particularly preferred monomer combination is butadiene and styrene. All of the weight and volume data below are based on this combination. If the technical equivalents of styrene and butadiene are used, the data must be recalculated as appropriate.

The soft block B/S is preferably composed of 75 to 30% by weight of styrene and from 25 to 70% by weight of butadiene. A particularly preferable soft block B/S has a butadiene proportion of from 35 to 70% and a styrene proportion of from 65 to 30%.

In the case of the monomer combination styrene/butadiene, the proportion by weight of the diene in the entire block copolymer is from 15 to 50% by weight, and that of the vinylaromatic component is correspondingly from 85 to 50% by weight. Particular preference is given to butadiene-styrene block copolymers with a monomer make-up of from 25 to 40% by weight of diene and from 75 to 60% by weight of vinylaromatic compounds.

The block copolymers P1) are obtainable by anionic polymerization in a non-polar solvent with addition of a polar cosolvent or of a potassium salt, as described, for example, in WO 96/20248 or WO 97/4007.

According to the invention, the proportion by weight of the soft phase built up from diene sequences and vinylaromatic sequences is from 60 to 95% by weight, preferably from 60 to 80% by weight, and particularly preferably from 65 to 75% by weight. The blocks S produced from the vinylaromatic monomers form the hard phase, the proportion by weight of which is correspondingly 5 to 40% by weight, preferably from 20 to 40% by weight and particularly preferably from 25 to 35% by weight.

The block copolymers have a property profile very similar to that of plasticized PVC, but can be prepared completely free from low-molecular-weight plasticizers which can migrate. They have high oxygen permeability $P_O$ and water vapor permeability $P_W$ of greater than 2,000 [cm$^3 \cdot$100 $\mu$m/m$^2 \cdot$d$\cdot$bar] and greater than 10 [g 100 $\mu$m/m$^2 \cdot$d$\cdot$bar] respectively, where $P_O$ is the amount of oxygen in cm$^3$, and $P_W$ is the amount of water vapor in grams, which permeates through 1 m$^2$ of film with a standard thickness of 100 $\mu$m per day and per bar of partial pressure difference.

The novel polymer mixtures comprise, as component P2), from 5 to 89% by weight, preferably from 18 to 78% by weight, particularly preferably from 25 to 55% by weight, of a block copolymer made from vinylaromatic monomers and from dienes and differing from P1).

The block copolymer P2) differs for example from P1) if it has an elongation at break of greater than 100% and a modulus of elasticity of greater than 100 MPa.

Preferred components P2) are tough and stiff styrene-butadiene block copolymers with a butadiene content in the range from 5 to 40% by weight, in particular from 10 to 30% by weight, of butadiene and from 60 to 95% by weight, in particular from 70 to 90% by weight, of styrene, based on the entire block copolymer P2). A particularly preferred block copolymer P2) is a non-elastomeric, star-shaped branched block copolymer. Another preferred component P2) is a block copolymer with terminal hard blocks S made from vinylaromatic monomers.

The molecular weight of the block copolymers P2) is generally in the range from 100,000 to 1,000,000 and preferably from 150,000 to 500,000. They may be linear or branched and are obtained by the usual methods of sequential anionic polymerization. The preparation of branched block copolymers suitable as component P2) is described, for example, in EP-A-0 046 862.

The linear or star-shaped styrene-butadiene block copolymers commercially available under the designations Styrolux® (BASF), K-Resin® (Phillips Petroleum) and Finaclear® (Fina) are also examples of suitable polymers.

The novel polymer mixtures may comprise, as component P3), from 10 to 94% by weight, preferably from 20 to 80% by weight, particularly preferably from 40 to 70% by weight, of a glass-clear or impact-modified polystyrene, or mixtures thereof.

Standard polystyrenes and impact-modified polystyrenes according to the invention, and their preparation, structure and properties, have been described in detail in the review literature (A. Echte, F. Haaf, J. Hambrecht in Angew. Chem. (Int. Ed. Engl.) 20, (1981) 344–361, and also in Kunststoffhandbuch, Vol. 4, Polystyrol, Carl Hanser Verlag (1996)). The impact-modified polystyrenes used may moreover have been structurally altered by the use of specific polybutadiene rubbers, e.g. those having 1,4-cis and 1,4-trans proportions or 1,2 linking and 1,4 linking proportions different from those of conventional rubbers. It is also possible instead of polybutadiene rubber to use other diene rubbers or also elastomers like ethylene-propylene-diene copolymer (EPDM rubber) or also hydrogenated diene rubbers. Suitable standard polystyrene is prepared by the anionic or free-radical polymerization process. The polymer's inhomogeneity, which can be affected by the polymerization process, is of subordinate significance here. Preference is given to standard polystyrene and impact-modified polystyrene which have a toluene-soluble fraction of molar mass $M_w$ from 50,000 to 500,000 g/mol, and which have also been modified, if desired, with additives, such as mineral oil, stabilizer, antistats, flame retardants or waxes.

The novel polymer mixtures may comprise, as component P4), from 0 to 84% by weight, preferably from 0 to 60% by weight, particularly preferably from 0 to 30% by weight, of other additives.

The novel polymer mixtures may comprise, as component P4), other additives, such as processing aids, stabilizers, oxidation inhibitors, agents to counteract decomposition by heat and decomposition by ultraviolet light, lubricants, mold-release agents, colorants, such as dyes and pigments, fibrous and pulverulent fillers, fibrous and pulverulent reinforcing agents, nucleating agents, plasticizers, etc., generally in proportions of not more than 70% by weight, preferably not more than 40% by weight.

Examples of oxidation inhibitors and heat stabilizers are halides of metals of group I of the Periodic Table, e.g. of sodium, of potassium and/or of lithium, if desired in combination with copper(I) halides, e.g. chlorides, bromides and iodides, sterically hindered phenols, hydroquinones, various substituted representatives of these groups and mixtures thereof in concentrations of up to 1% by weight, based on the weight of the thermoplastic molding composition.

UV stabilizers which may be mentioned, and are generally used in amounts of up to 2% by weight, based on the molding composition, are various substituted resorcinols, salicylates, benzotriazoles and benzophenones.

It is also possible to use organic dyes, such as nigrosin, pigments, such as titanium dioxide, cadmium sulfide, cadmium selenide, phthalocyanines, ultramarine blue and carbon black as colorants, and also fibrous and pulverulent fillers and fibrous and pulverulent reinforcing agents. Examples of the latter are carbon fibers, glass fibers, amorphous silica, asbestos, calcium silicate (wollastonite), aluminum silicate, magnesium carbonate, kaolin, chalk, powdered quartz, mica and feldspar. The proportion of such fillers and colorants is generally up to 50% by weight, preferably up to 35% by weight.

Examples of nucleating agents which may be used are talc, calcium fluoride, sodium phenylphosphinate, alumina, silica and nylon 2,2.

Examples of mold-release agents and lubricants, which may generally be used in amounts of up to 1% by weight, are long-chain fatty acids, such as stearic acid or behenic acid, salts of these (e.g. calcium stearate or zinc stearate) or esters (e.g. stearyl stearate or pentaerythritol tetrastearate) and also amide derivatives (e.g. ethylenebisstearylamide). To improve film processing, amounts of up to 0.1% by weight of mineral-based antiblocking agents may be added to the novel molding compositions. Examples of these are amorphous or crystalline silica, calcium carbonate and aluminum silicate.

Examples of plasticizers are dioctyl phthalate, dibenzyl phthalate, butyl benzyl phthalate, hydrocarbon oils, N-n-butylbenzenesulfonamide and o- and p-tolylethylsulfonamide.

To further improve flame retardancy, any of the flame retardants known for the respective thermoplastics may be added, in particular red phosphorus and/or flame retardants based on phosphorus compounds.

The novel molding compositions may be prepared by processes known per se. In a preferred embodiment, preparation is by adding component $P_1$) and, if desired, $P_3$) to the melt of component $P_2$).

Extruders, e.g. single-screw or twin-screw extruders, or other conventional plasticating apparatuses, such as Brabender mixers or Banbury mixers, may usefully be used for this purpose.

The novel polymer mixtures have good mechanical properties (stiffness and toughness) and good heat resistance.

They are therefore suitable for producing moldings and semi-finished products of any type, such as milled sheets, expansion bellows, flexible bellows, mats, covers, floorcoverings, shoe soles, wall-to-wall carpet backings, artificial leather, blow moldings, extruded profiles, injection moldings, extruded pipes, and also three-dimensional blow moldings.

Surprisingly, it has been found that polymer mixtures made from P1) and P2) in any mixing ratio are transparent despite the presence of a three-phase system. The yield stress of these polymer mixtures rises linearly with the proportion of P2). This permits, for example, the adjustment of hardness, toughness and flexibility in films or other applications, such as injection moldings.

Depending on their make-up, polymer mixtures made from P1), P2) and P3) can cover the range of properties from transparent, impact-modified polystyrene to thermoplastic elastomers (TPE). They are particularly suitable for transparent films.

The novel polymer mixtures with modified polystyrene (HIPS) as component P3) have higher stress cracking resistance than pure impact-modified polystyrene.

EXAMPLES

Component P1

Component P1 was prepared in accordance with DE-A 44 20 952:

A 50 l stainless steel reactor capable of being heated and cooled and fitted with a cross-bar stirrer was prepared by flushing with nitrogen and scalding with a solution of sec-butyllithium and 1,1-diphenylethylene in cyclohexane (molar ratio: 1:1) and drying.

22.8 l of cyclohexane and 42 ml of sec-butyllithium as initiator were placed into the reactor with 65.8 ml of tetrahydrofuran, and the amounts of styrene (S) and butadiene (B) shown in Table 1 below were added according to the time cycle program given. The data given are the duration t in minutes of the polymerization and the initial and final temperatures $T_I$ and $T_F$, respectively (in ° C.), and it should be pointed out that the duration of the polymerization was always large when compared with the duration of the monomer feed.

The temperature of the reaction mixture was controlled by heating or cooling the reactor jacket. After the reaction had finished (consumption of the monomers), ethanol was titrated in until the mixture was colorless, and the mixture was acidified with a 1.5-fold excess of formic acid. Finally, 34 g of a commercially available stabilizer (2-tert-butyl-6-(3-tert-butyl-2-hydroxy-5-methylbenzyl)-4-methylphenyl acrylate (Irganox® 3052; Ciba-Geigy, Basel)) and 82 g of tris(nonylphenyl) phosphite were added.

The solution was worked up on a vented extruder (three domes, forward and backward degassing) at 200° C., and granulated. The granules were mixed in a fluid mixer with 10 g of bisstearylamide (Acrawax) as external lubricant.

The block copolymer had a melt volume rate MFR (200° C./5 kg) of 12 cm$^3$/10 min.

TABLE 1

|  | Component P1 |
| --- | --- |
| THF (ml) | 65.8 |
| sec-BuLi (ml) | 42 |
| Styrene 1 (g) | 1245 |
| T(I)/T(F) (° C.) | 30/75 |
| time (min) | 30 |
| Butadiene 1 (g) | 1101 |
| Styrene 2 (g) | 1323 |
| T(I)/T(F) (° C.) | 56/73 |
| time (min) | 19 |
| Butadiene 2 (g) | 1101 |
| Styrene 3 (g) | 1323 |
| T(I)/T(F) (° C.) | 52/76 |
| time (min) | 22 |
| Butadiene 3 (g) | 1101 |
| Styrene 4 (g) | 1323 |
| T(I)/T(F) (° C.) | 54/73 |
| time (min) | 19 |
| Styrene 5 (g) | 1245 |
| T(I)/T(F) (° C.) | 60/64 |
| time (min) | 45 |
| $M_n$ (g/mol)* | 117,000 |
| $M_p$ (g/mol)* | 153,000 |
| $M_w$ (g/mol)* | 169,000 |

*The molar masses were determined by gel permeation chromatography with a polystyrene standard ($M_p$ = molar mass at peak maximum).

Component P2-1)

Styrene-butadiene block copolymer with a melt volume rate MFR (200° C./5 kg) of 14 cm$^3$/10 min and a tensile modulus of elasticity of 1300 MPa (Styrolux® 693 D from BASF).

Component P2-2)

Styrene-butadiene block copolymer with a melt volume rate MFR (200° C./5 kg) of 11 cm$^3$/10 min and a tensile modulus of elasticity of 1550 MPa (Styrolux® 684 D from BASF).

Component P3-1)

Standard polystyrene with a melt volume rate MFR (200° C./5 kg) of 3 cm$^3$/10 min and a tensile modulus of elasticity of 3300 MPa (polystyrene 158 K from BASF).

Component P3-2)

Standard polystyrene with a melt volume rate MFR (200° C./5 kg) of 2.5 cm$^3$/10 min and a tensile modulus of elasticity of 3300 MPa (polystyrene 165 H from BASF).

Component P3-3)

Highly impact-resistant polystyrene with a melt volume rate MFR (200° C./5 kg) of 3 cm$^3$/10 min and a tensile modulus of elasticity of 1800 MPa (polystyrene 486 M from BASF).

Preparation of the Molding Compositions

Components P1) to P4), in the proportions by weight given in Table 2, were melted in a twin-screw extruder (ZSK 25 from Werner & Pfleiderer) at 200° C. and a throughput of 10 kg/h, homogenized and extruded into a waterbath. The dried granules were then injection molded to give standard test specimens.

Tables 2 and 3 give the properties of the polymer mixtures, measured on compression-molded and injection-molded test specimens, respectively.

Film Production

The novel films, and also the films produced for comparative purposes, were produced in an extruder (Battenfeld; screw diameter 45 mm, screw length 25 D, melt temperature 214° C.) by the chill roll process with a roll temperature of 60° C.

The films had a thickness of about 250 μm.

The make-ups of the films and the results of the measurements are given in Tables 4 and 5.

Measurement Methods

The melt volume rate MFR (200° C./5 kg) was measured in accordance with ISO 1133.

The test specimens for the mechanical tests were injection molded at 220° C. melt temperature and 45° C. mold temperature. Modulus of elasticity, yield stress, breaking stress, yield elongation and elongation at break were determined in the tensile test in accordance with ISO 527 with tensile specimens in accordance with ISO 3167.

The Charpy impact strength was tested in accordance with ISO 179/leU, and the Charpy notched impact strength in accordance with ISO 179/leA on injection moldings with dimensions 80×10×4 mm.

Gloss was determined on flat injection-molded test specimens of 1.5 mm thickness, at angles of incidence of 20°, 65° and 85°. 100 scale divisions (SD) here represent total reflection at an interface. Values greater than 100 scale divisions indicate reflection on upper and lower sides. Relative transparencies were determined against air on injection moldings of 4 mm thickness.

The Vicat softening points VST/A and VST/B were determined in accordance with the DIN ISO 306 test specification.

The falling weight test was carried out to DIN 53 443.

The polybutadiene fraction (PBu) was determined by Wijs titration.

Films 1 to 7 have good transparency. Films 5 to 7, which also comprise small amounts of impact-modified polystyrene, have very good toughness with excellent stiffness.

TABLE 2

Polymer mixture make-ups and properties (compression-molded test specimens)

| Ex. | P1) | P2-1) | P3-1) | Viscosity number (VN) 0.5% in tol. | MFR 200° C./ 5 kp | 230° C./ 5 kp | Vicat softening point (° C.) A | B | Modulus of elasticity (N/mm²) |
|---|---|---|---|---|---|---|---|---|---|
| C1 | 100 | 0 | 0 | 110.3 | 11.6 | 25.2 | 35.5 | — | 17 |
| C2 | 80 | 20 | 0 | 103.4 | 10.6 | 21.7 | 35.5 | — | 14 |
| C3 | 60 | 40 | 0 | 97.7 | 10.4 | 21.8 | 41.9 | — | 35 |
| C4 | 40 | 60 | 0 | 89.7 | 10.7 | 22.7 | 54.8 | — | 116 |
| C5 | 20 | 80 | 0 | 84.5 | 10.9 | 25.7 | 68.5 | — | 352 |
| C6 | 10 | 90 | 0 | 82.1 | 11.5 | 30.7 | 73.2 | 36.4 | 528 |
| C7 | 80 | 0 | 20 | 106.1 | 9.8 | 20.7 | 39.5 | — | 16 |
| C8 | 60 | 0 | 40 | 103.4 | 8.8 | 19.4 | 56 | — | 51 |
| C9 | 40 | 0 | 60 | 102.8 | 7.8 | 19.9 | 101 | 76.1 | 805 |
| C10 | 20 | 0 | 80 | 101.3 | 5.2 | 14.8 | 104 | 93.8 | 2002 |
| C11 | 0 | 100 | 0 | 79 | 12.3 | 29.2 | 79 | 49.5 | 589 |
| C12 | 0 | 80 | 20 | 82.8 | 9.4 | 23.2 | 88.6 | 59.7 | 1029 |
| C13 | 0 | 60 | 40 | 85.5 | 7.2 | 18.6 | 94.9 | 71.7 | 1382 |
| C14 | 0 | 40 | 60 | 89.7 | 6 | 16.4 | 100 | 84.1 | 1878 |
| C15 | 0 | 20 | 80 | 93.3 | 4.7 | 14.9 | 104 | 97 | 2612 |
| 1 | 75 | 5 | 20 | 102.9 | 9.1 | 20.2 | 48.9 | 50 | 19 |
| 2 | 55 | 5 | 40 | 102.4 | 8.4 | 18.6 | 74 | 39.9 | 76 |
| 3 | 60 | 20 | 20 | 99.7 | 8.6 | 18.1 | 44.5 | — | 32 |
| 4 | 40 | 40 | 20 | 94.2 | 8.6 | 21.1 | 63.3 | 37.5 | 91 |
| 5 | 20 | 60 | 20 | 93.2 | 9 | 20.7 | 80 | 46.9 | 454 |
| 6 | 10 | 70 | 20 | 85.3 | 9.2 | 22.4 | 85.3 | 53 | 707 |
| 7 | 40 | 20 | 40 | 98.3 | 7.6 | 18.3 | 89.1 | 55 | 157 |
| 8 | 20 | 40 | 40 | 92.4 | 7.5 | 18.1 | 93.3 | 64.4 | 663 |
| 9 | 10 | 50 | 40 | 89.9 | 7.5 | 20.9 | 93.8 | 66.7 | 1064 |
| 10 | 20 | 20 | 60 | 95.6 | 7 | 15.8 | 101 | 84.9 | 1499 |
| 11 | 10 | 30 | 60 | 93.9 | 6.2 | 15.9 | 101 | 84.9 | 1882 |
| C16 | 100 | 0 | 0 | 110.7 | 11.5 | 22 | 37.3 | — | 15 |
| C17 | 0 | 0 | 100 | | 3 | | 106 | 101 | |

| Ex. | Yield stress (N/mm²) | Elongation at FS (%) | max. stress (N/mm²) | Breaking stress (N/mm²) | Elongation at break (%) | Transparency Y | Yellow. Index YI | Haze H % |
|---|---|---|---|---|---|---|---|---|
| C1 | 2.1 | 19.8 | 26.8 | 26.7 | 651 | 84.4 | 4.9 | 12.7 |
| C2 | 2.2 | 19.4 | 26.7 | 26.7 | 606 | 85.1 | 4.8 | 11.6 |
| C3 | 4 | 33.8 | 29.5 | 29.5 | 560 | 83.8 | 6.7 | 16.3 |
| C4 | 6.5 | 26 | 28.8 | 28.8 | 478 | 80.9 | 9.6 | 17.1 |
| C5 | 9.4 | 9.3 | 28.4 | 28.4 | 416 | 82.6 | 8.2 | 12.2 |
| C6 | 11.3 | 4.6 | 29.2 | 29.1 | 406 | 82.4 | 5.3 | 12.8 |
| C7 | 2.4 | 27 | 28.5 | 28.5 | 483 | 78.5 | 13.1 | 17.6 |
| C8 | 11.7 | — | 22.7 | 22.3 | 209 | 66.5 | 21.6 | 90 |
| C9 | 20.4 | 11.7 | 24 | 23.5 | 133 | 63.4 | 15.4 | 100 |
| C10 | 36.4 | 0 | 36.4 | 35.5 | 2.6 | 62.6 | 17.3 | 95.8 |
| C11 | 12.6 | 4.9 | 30.1 | 29.9 | 389 | 83.8 | 4.6 | 14.1 |
| C12 | 18.2 | 5.9 | 30.1 | 29.9 | 302 | 83.3 | 7.8 | 13.2 |
| C13 | 25.8 | 7.3 | 25.8 | 23.1 | 168 | 77.9 | 18.1 | 13.4 |
| C14 | 33.9 | 2.9 | 33.9 | 27.8 | 21.4 | 71.3 | 26 | 19.6 |

TABLE 2-continued

Polymer mixture make-ups and properties (compression-molded test specimens)

| | | | | | | | | |
|---|---|---|---|---|---|---|---|---|
| C15 | 40.4 | 0 | 40.4 | 40.4 | 2 | 72.2 | 23.4 | 17.9 |
| 1 | 3.1 | 44.8 | 30.3 | 30.2 | 479 | 78.8 | 21.9 | 17.2 |
| 2 | 20.4 | — | 26.3 | 26 | 239 | 68.2 | 26.4 | 23.8 |
| 3 | 5.1 | 44 | 26.8 | 26.7 | 364 | 78 | 14.9 | 16 |
| 4 | 14.9 | — | 29.8 | 29.7 | 344 | 73.9 | 19.4 | 20.9 |
| 5 | 14.2 | 21.7 | 31.4 | 31.2 | 322 | 73.6 | 20.3 | 17.2 |
| 6 | 16.6 | 20.9 | 30.3 | 30 | 305 | 77.4 | 16.2 | 16.4 |
| 7 | 18.3 | 63.9 | 30.5 | 30.2 | 282 | 58 | 12.3 | 78.9 |
| 8 | 20.6 | 14.6 | 31.7 | 31.4 | 249 | 55.7 | 28.2 | 47.1 |
| 9 | 24.2 | 10.6 | 30 | 29.4 | 219 | 65.7 | 18.2 | 84.2 |
| 10 | 31.7 | 3.1 | 31.7 | 26.6 | 53.8 | 50.3 | 15 | 77.8 |
| 11 | 36 | 2.7 | 36 | 28.8 | 12.5 | 57.9 | 23.5 | 50.6 |
| C16 | 2.3 | 19.4 | 26 | 25.9 | 641 | 85.1 | 4.6 | 11.8 |
| C17 | | | | | | | | |

TABLE 3

Polymer mixture properties (injection-molded test specimens)

| Ex. | Vicat softening point (° C.) A | Vicat softening point (° C.) B | Modulus of elasticity (N/mm$^2$) | Yield stress (N/mm$^2$) | Elongation at FS (%) | Breaking stress (N/mm$^2$) | Elongation at break (%) | Fraction energy Nmm/mm$^2$ | Charpy kJ/mm$^2$ | Fracture |
|---|---|---|---|---|---|---|---|---|---|---|
| C1 | 35.2 | — | 34.9 | 2.2 | 13 | 14.1 | 479 | 1525 | 51.3 | ND |
| C2 | 39.3 | — | 125 | 3.5 | 12.3 | 16.7 | 445 | 1865 | 67 | ND |
| C3 | 47.6 | — | 349 | 5.7 | 3.7 | 18.6 | 395 | 2133 | 82.3 | ND |
| C4 | 56.3 | — | 712 | 9.3 | 2.6 | 19.8 | 353 | 2255 | 104 | ND |
| C5 | 66.1 | 38.7 | 892 | 14.7 | 2.7 | 20.8 | 305 | 2219 | 126 | ND |
| C6 | 69.7 | 42.9 | 1081 | 18.6 | 2.5 | 20.9 | 291 | 2222 | 133 | ND |
| C7 | 48.9 | — | 270 | 7.8 | 43.7 | 17.2 | 163 | 1525 | 105 | ND |
| C8 | 69.8 | 39 | 736 | 15.8 | 19 | 19.3 | 118 | 1033 | 164 | ND |
| C9 | 91.8 | 61.5 | 1807 | 29.7 | 3.4 | 23.8 | 36 | 499 | 20.5 | F |
| C10 | 103 | 89.4 | 2750 | 50.7 | 3.4 | 50.7 | 34 | 66 | 22.3 | ND |
| C11 | 75.6 | 48.7 | 1288 | 21.6 | 2.5 | 20 | 257 | 1989 | 140 | F |
| C12 | 85.1 | 60.4 | 1763 | 29.9 | 2.5 | 17.9 | 20.4 | 217 | 28.4 | F |
| C13 | 94.8 | 73.3 | 2161 | 34.8 | 2.4 | 23.7 | 20.6 | 263 | 35.2 | F |
| C14 | 99.7 | 84.7 | 2542 | 40.8 | 2.5 | 30.7 | 11.3 | 193 | 42.6 | |
| C15 | 104 | 95.9 | 2988 | 49.7 | 2.9 | 45.4 | 3.9 | 70 | 36.7 | |
| 1 | 54.2 | 37.5 | 316 | 7.8 | 34.1 | 17.9 | 264 | 1601 | 96 | |
| 2 | 70 | 43.8 | 832 | 16.2 | 14.7 | 19.6 | 112 | 1015 | 180 | |
| 3 | 56.8 | 37.8 | 550 | 8.8 | 15.6 | 18.6 | 235 | 1593 | 122 | |
| 4 | 64.9 | 38.5 | 812 | 11;2 | 4.9 | 20.6 | 224 | 1747 | 128 | |
| 5 | 75.7 | 48.5 | 1354 | 20.4 | 2.4 | 21.1 | 195 | 1735 | 164 | |
| 6 | 80.9 | 54.4 | 1579 | 26.1 | 2.5 | 17.7 | 43 | 411 | 176 | |
| 7 | 77.4 | 48 | 1159 | 18.6 | 12.1 | 20.2 | 105 | 1027 | 196 | |
| 8 | 88.3 | 60.3 | 1679 | 25.9 | 2.4 | 20.5 | 55.9 | 627 | 27.4 | |
| 9 | 91.5 | 66.8 | 1945 | 32.7 | 2.6 | 20.1 | 24.5 | 306 | 23.5 | |
| 10 | 97.4 | 76.1 | 2223 | 39.2 | 3 | 24 | 19.6 | 305 | 24.5 | |
| 11 | 99.2 | 80.4 | 2415 | 43.4 | 2.8 | 27.8 | 8.6 | 136 | 40.8 | |
| C16 | 35.3 | — | 42 | 2.2 | 11.6 | 14.2 | 486 | 1578 | 52.5 | |
| C17 | 106 | 101 | 3200 | 55 | 3 | 55 | 3 | | | |

ND: not determined
F: fracture

TABLE 4

Film make-ups and properties

| | | | Make-up | | | |
|---|---|---|---|---|---|---|
| | | | Film 1 | Film 2 | Film 3 | Film 4 |
| | | | | P1) | | |
| | | | | 2.5 | 5 | 7.5 |
| | | | | P2-2) | | |
| | | | 50 | 37.5 | 25 | 15 |
| | | | | P3-2) | | |
| | | | 50 | 60 | 70 | 77.5 |
| Tests | Unit | Test specimen | Film 1 | Film 2 | Film 3 | Film 4 |
| Modulus of elasticity | MPa | Film/longitudinal | 2137 | 2362 | 2542 | 2556 |
| Yield stress | MPa | " | 35.1 | 36.7 | 37.8 | 39.4 |
| Breaking stress | MPa | " | 26.4 | 26.8 | 26.9 | 28.5 |
| Stress at 600% | MPa | " | 0 | 0 | 0 | 0 |
| Yield elongation | % | " | 2 | 1.9 | 1.8 | 2 |
| Elongation at break | % | " | 0 | 0 | 0 | 0 |
| Nomi.elongation at break | % | " | 25 | 22.9 | 7.8 | 12.8 |
| Modulus of elasticity | MPa | Film/transverse | 1647 | 1894 | 2124 | 2209 |
| Yield stress | MPa | " | 24.1 | 26.5 | 30.3 | 33.9 |
| Breaking stress | MPa | " | 20.8 | 21.5 | 25.1 | 31 |
| Stress at 600% | MPa | " | 0 | 0 | 0 | 0 |
| Yield elongation | % | " | 2.2 | 1.9 | 2 | 2 |
| Elongation at break | % | " | 0 | 0 | 0 | 0 |
| Nomi.elongation at break | % | " | 18.5 | 8.2 | 4.6 | 2.8 |
| Penetration test | Nm | Film disk | 0.019 | 0.09 | 0.08 | 0.01 |
| Falling weight test | Nm | Film disk | 0.22 | 0.19 | 0.21 | 0.18 |
| Gloss 20°/60°/85° angle | — | Film outside | 98/136/101 | 100/146/101 | 125/155/103 | 136/155/103 |
| Gloss 20°/60°/85° angle | — | Film inside | 103/136/100 | 101/142/102 | 119/149/103 | 127/152/103 |
| Transparency | % | Film | 87.8 | 87.9 | 88.1 | 88.1 |
| Shrinkage longitudinal | outside | Film | 46 | 48 | 50 | 44 |
| Shrinkage longitudinal | middle | " | 41 | 47 | 46 | 49 |
| Shrinkage longitudinal | outside | " | 48 | 52 | 51 | 53 |
| Shrinkage transverse | outside | " | +6 | +6 | +9 | +11 |
| Shrinkage transverse | middle | " | +2 | +7 | +5 | +4 |
| Shrinkage transverse | outside | " | +7 | +6 | +7 | +11 |
| MFR 200/5 | cm$^2$/min. | Film | 6.2 | 5.5 | 5 | 4.2 |
| vicat soft. point/B | ° C. | Film | 71 | 75.5 | 84.4 | 86.7 |
| vicat soft. point/A | ° C. | Film | 94 | 95.1 | 95.8 | 95.8 |
| PBU | % | Film | 12.8 | 10.4 | 8.1 | 6.6 |
| Iodine number | — | Film | 58.7 | 47.7 | 37.2 | 30.3 |
| Density | g/cm$^2$ | 2 × 2 cm sheet | 1.026 | 1.026 | 1.029 | 1.034 |
| Film thickness | μm | Film | 267 | 259 | 256 | 259 |

TABLE 5

Composition and properties of films 5 to 7

| | | | Film 5 | Film 6 | Film 7 |
|---|---|---|---|---|---|
| Composition | | | | | |
| P1) | | | | 2.5 | 5 |
| P2-2) | | | 48.5 | 34.5 | 22 |
| P3-2) | | | 48.5 | 60 | 70 |
| P3-3) | | | 3 | 3 | 3 |
| Modulus of elasticity | MPa | Film/longitudinal | 2170 | 2297 | 2399 |
| Modulus of elasticity | MPa | Film/transverse | 1677 | 1860 | 2053 |
| Falling weight test | Nm | Film disk | 0.27 | 0.49 | 0.45 |
| Transparency | % | Film | 86.2 | 85.3 | 85.3 |
| Vicat softening point/B | ° C. | Film | 70.6 | 75.9 | 84.4 |
| PBu | % | Film | 12.8 | 10.4 | 8.1 |
| Film thickness | μm | Film | 250 | 250 | 250 |

We claim:

1. A polymer mixture comprising

P1) from 5 to 35% by weight of an elastomeric block copolymer which has been built up from hard blocks S made from vinylaromatic monomers and from random soft blocks B/S made up from dienes and from vinylaromatic monomers, and which contains at least the block structure S-B/S-S, where the diene content is less than 50 percent by weight and the proportion of the soft phase formed from the blocks B/S is at least 60 percent by weight, based in each case on the entire block copolymer, P2) from 25 to 55% by weight of a block copolymer differing from P1) and made from vinylaromatic monomers and from dienes, P3) from 40 to 70% by weight of glass-clear or impact-modified polystyrene or mixtures thereof, and P4) from 0 to 30% by weight of other additives, where the total of components P1) to P4) is 100%.

2. A polymer mixture as claimed in claim 1, wherein the block copolymer P2) used is a block copolymer with an elongation at break of greater than 100% and a modulus of elasticity of greater than 100 MPa.

3. A polymer mixture as claimed in claim 2, wherein the block copolymer P2) used is a star-shaped branched block copolymer made from from 60 to 95% by weight of a vinylaromatic monomer and from 40 to 5% by weight of a conjugated diene.

4. A polymer mixture as claimed in claim 1, wherein the block copolymer P2) used is a block copolymer with terminal hard blocks S made from vinylaromatic monomers.

5. A fiber, a film or a molding obtainable from the polymer mixtures as claimed in claim 1.

* * * * *